J. H. STEPHENS.
HOSE COUPLING.
APPLICATION FILED MAY 17, 1909.
964,578.
Patented July 19, 1910.
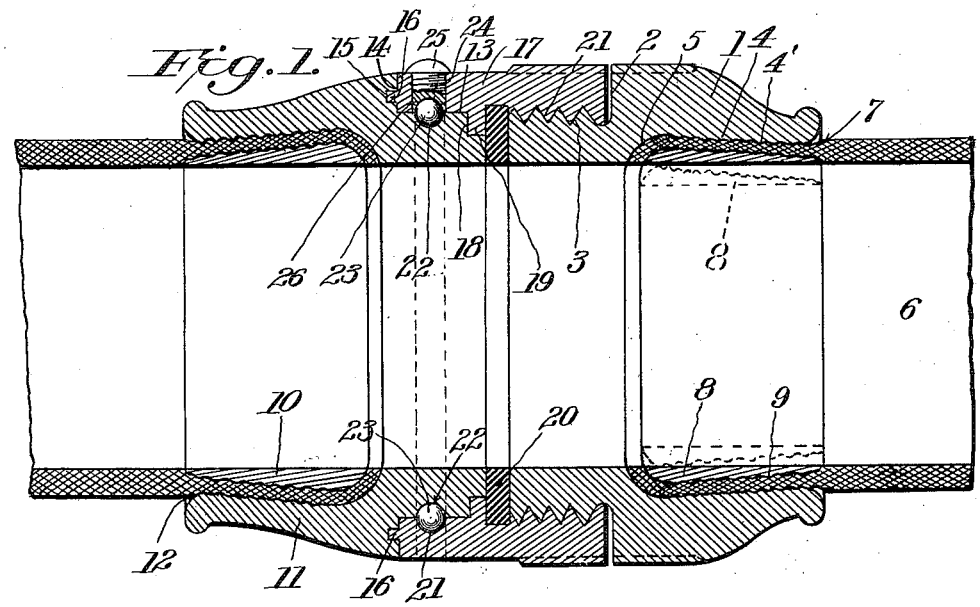
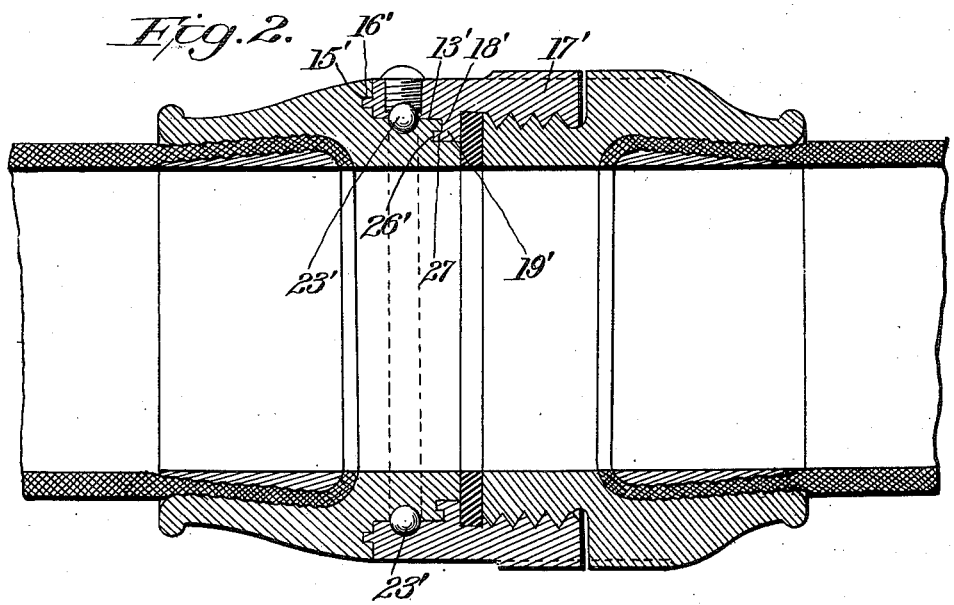
Witnesses
C. H. Walker
E. S. Dalton
Inventor
John H. Stephens
By H. E. Holmak
Attorney

UNITED STATES PATENT OFFICE.

JOHN H. STEPHENS, OF VERNON, TEXAS.

HOSE-COUPLING.

964,578.

Specification of Letters Patent. Patented July 19, 1910.

Application filed May 17, 1909. Serial No. 496,523.

*To all whom it may concern:*

Be it known that I, JOHN H. STEPHENS, a citizen of the United States, residing at Vernon, in the county of Wilbarger and State of Texas, have invented certain new and useful Improvements in Hose-Couplings, of which the following is a specification.

This invention relates to hose couplings.

In hose couplings now in common use, the flexible tubing is frequently weakened, if not damaged beyond repair, by the expansion of the rings, sleeves, thimbles and the like against the interior of the tubing, and this defect is generally the result of expanding cylindrical rings and the like as much at their outer as at their inner ends. Considerable force is necessary to expand a cylindrical shaped ring in order that it may have the proper clamping action upon the tube to prevent accidental withdrawal of the latter from the coupling incident to a straight or longitudinal pull upon the tubing, resulting either from heavy pressure or frequent or rough handling of the hose. Furthermore, by virtue of heavy pressure or rough handling of the hose, the latter becomes weakened at the ends of the coupling incident to frictional or other engagement with the sharp-edged mouths of the coupling, causing leakage in a comparatively short time. In the hose couplings now on the market of that type wherein one member is adapted to rotate upon another, it frequently happens that there is such binding action between the two members as to preclude the possibility of a free and easy rotation of the members relative to each other, due in some instances to a comparatively broad inner surface of one member operating upon a comparatively broad outer surface of the other member.

It is therefore one object of my invention to provide a hose coupling whose parts are constructed and arranged to spread the inner ends of the hose sections and at their inner ends force the clamping thimbles into engagement therewith to a greater extent than the thimbles are forced into engagement with the hose sections at the mouths of the coupling and thereby anchor the hose sections in the end of the coupling against accidental longitudinal or a twisting withdrawal from the coupling.

Another object of the invention resides in the provision of a hose coupling comprising in its organization of elements means whereby the inner ends of the hose sections may be spread considerably without placing undue strain upon the hose sections at the outer ends of the coupling, so that the hose sections are anchored firmly at their extreme inner ends within the body of the coupling and at points where any undue strains thereupon, which would even tear the fibers thereof incident to great force in expanding the hose sections, would not cause leakage, as would be the case if the hose sections were subjected to as much strain at the extreme ends of the couplings as at the points within the coupling, whereby I am enabled to effectually anchor the hose sections even to the extent of tearing the fibers thereof without a consequent leaking of the hose.

A still further object of the invention is to provide a hose coupling embodying among other characteristics a male and a female member, each provided with a removable clamping thimble to clamp the hose sections in the coupling, one of said members including a body portion and a sleeve which have tongue and groove connection between them to insure against lateral movement of the sleeve with respect to the body portion to such an extent as to prevent the presentation of a comparatively large inner surface of the sleeve to a comparatively large outer surface of the body portion, there being a race-way formed between the body portion and sleeve for the reception of bearing balls which coöperate with the aforesaid tongue and groove connection to prevent lateral movement of the sleeve with respect to the body portion and which bearing balls also prevent longitudinal separation of said body portion and sleeve and which also provide for a free and easy rotation of the sleeve upon the body portion, the sleeve being adapted to connect the body portion of the female member and the male member together, and insuring a positive connection between the male and female members.

It is still further designed to provide a hose coupling embodying a male member and also a female member composed of a body portion and a sleeve connected together by bearing balls and also by a tongue and groove connection, the tongue and groove being so disposed that the body portion and sleeve may be separated without disconnecting the hose from the body portion, all of the parts of the coupling being so associated with one another that the male member may be separated from the sleeve without separating the sleeve from the body portion of the female member or without disconnecting the hose section from the male member.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings:—Figure 1 is a longitudinal sectional view of one type of my improved coupling in its assembled condition, the position of one of the thimbles prior to expansion being shown in dotted lines. Fig. 2 is a similar view of a modified form of the invention.

Referring now more particularly to the accompanying drawings, the reference character 1 indicates the body of the male member, whose inner end is reduced to provide a shoulder 2, which is preferably exteriorly screw threaded, as indicated at 3.

The interior of the male coupling member is hollow with its outer internal portion tapered, as at 4, and of greater diameter than at its inner internal portion to provide an annular shoulder 5, against which the inner end of the hose section 6 is preferably disposed, the outer end of the male coupling at the edge of its larger internal portion being preferably rounded, as indicated at 7, to obviate a sharp edge and thereby prevent undue wear and consequent weakening of the hose at the mouth of the male member incident to frequent engagement of the hose section with the rounded edge due to pressure or handling of the hose.

The character 8 indicates a substantially cone shaped expansible thimble which, after the hose section 6 is disposed in the outer end of the male coupling 1 and against the shoulder 5 of the latter, is passed into the male coupling member from the inner end of the latter. This thimble 8 is tapered externally, as shown, and provided with concentric ribs or threads 9 adapted to engage the interior of the hose section 6 to bind the latter between said thimble and the tapering internal portion of the male member 1, when said thimble is expanded from the dotted line position shown in Fig. 1 to the full line position shown therein. The tapering internal portion 4 is provided with the concentric ribs 4', for the same purpose as that for which the ribs 9 of the thimble 8 are designed, the ribs 4' engaging the outer surface of the hose section.

By virtue of the tapered clamping surfaces of the male member 1 and the thimble 8, the hose section 6 has its inner ends spread or flared outwardly, thereby firmly anchoring the hose section at its extreme inner end and overcoming the possibility of a lateral twisting, straight, or longitudinal pulling action upon the hose incident to pressure or otherwise from pulling the hose section out of its anchored position.

Any suitable spreading tool (not shown) may be used to expand the thimble 8, but it will be understood that the thickened or shouldered inner end of the thimble is expanded to a lesser extent than is the thinner outer end of the thimble. It will be noted that the outer end of the thimble is quite thin, as compared with the inner end thereof, and it will be understood that said method of expanding the thimble is followed for the purpose of placing most of the strain upon the hose at its extreme inner end rather than at the rounded outer end of the male member, so that the texture of the hose will not be strained or torn and thereby weakened at the mouth of the male member. This method of expanding the thimble 8 also prevents weakening of the hose at a point where it would be quickly subject to leakage incident to heavy pressure or constant handling of the hose. As a matter of fact, the fibers of the hose adjacent the inner end of the thimble may be torn by forcing the inner end of the thimble against the extreme inner end of the hose section without causing leakage owing to the strained texture being disposed within rather than at the end of the coupling. Moreover, by tearing the hose at its inner end where it is flared outwardly, incident to expansion of the thimble, there would be a greater binding action upon the hose, which would assist in preventing the hose from being pulled out of position between the male member and its thimble. The same method of expanding the thimble 10 of the female member, about to be described, is employed for the same purposes.

The female coupling member includes a body portion 11 which is hollow, and which has its interior tapering from its inner to its outer end with the outer end rounded, as indicated at 12, to obviate a sharp edge, for the same reason as stated in connection with the male member. The said body portion 11 of the female member is reduced at its inner end, to provide a bearing surface 13 and an annular shoulder 14, in which latter, substantially midway between said bearing surface 13 and the outer surface of the body 11, is formed an annular groove 15 to receive an annular tongue 16 of a coupling sleeve 17, which coöperates with the body 11 to form the female member. The body portion 11 of the female member is further reduced to form a shoulder 18, against which is adapted to fit one face of an annular rib 19 on the sleeve 17, there being a gasket 20 adapted to fit against the opposite face of the shoulder 19 and also against the inner end of the body portion 11 and held in such position by the inner end of the male member 1 when the sleeve 17 has its screw threads 21 worked upon the screw threads 3 of the male member 1 to cause the members to assume operative positions with relation to each other and thereby prevent leakage between the joints, all as clearly shown in Fig. 1.

The tongue and groove connection between the body portion 11 and the sleeve 17 prevents such lateral movement of the sleeve or body portion with respect to each other as would tend to cause such binding action between the body portion and sleeve as would interfere with a free rotating movement of the sleeve 17 when the latter is rotated. The shoulder 19 coöperates with the tongue and groove 15—16, respectively, for the same purpose, and in order to further reduce frictional resistance and to insure a free and easy swivel movement of the sleeve 17 of the female member, I provide the latter between its shoulder 18 and groove 15 with a groove 21, which is substantially semi-circular in cross section and which is designed to coincide with a substantially semi-circular groove 22 in the sleeve 17 to provide a raceway for the reception of bearing balls 23, there being an opening 24 in the sleeve 17 registering with the groove 22 to permit of the insertion of bearing balls 23. To prevent accidental movement of the bearing balls 23 out of said race-way, I provide a closure preferably in the form of a screw 25, which has the inner end of its shank portion concaved, as indicated at 26, to agree with the curvature of the groove 22 in the sleeve 17, and thereby insure against an obstruction in the race-way, as will be understood.

In Fig. 2 I illustrate a coupling similar in all respects to the coupling illustrated in Fig. 1, and hereinbefore described, except that in the shoulder 18' of the modified form I form an annular groove 26' adapted to receive an annular tongue 27 leading from the shoulder 19' of the sleeve 17'. This tongue and groove connection 26—27 coöperates with the tongue and groove connection 15'—16' for the same purpose as that stated in connection with the tongue and groove connection 15—16 in Fig. 1, and it will be noted that the tongue and groove connections 15'—16' and 26'—27 are diagonally opposite each other and upon opposite sides of the bearing balls 23', the shoulder 19 in Fig. 1 being diagonally opposite the tongue and groove connection 15—16 of Fig. 1, and arranged upon opposite sides of the bearing balls 23, whereby the bearing faces 13 and 13' of the body portions 11 and 11' of the female members of Figs. 1 and 2, respectively, are not permitted to be engaged by the interior of the sleeve 17 and 17', respectively, in such a way as to cause a binding action between the sleeves and body portions in the swiveled movements of the latter.

It will now be understood that the hose sections are clamped to the male member 1 and to the body portion 11 of the female member by the thimbles 8 and 10, respectively. By virtue of the disposition of the groove and tongue connection 15—16 between the body portion 11 and the sleeve 17 of the female member, the former, after removing the balls 23 from their race-way, can be disconnected from the sleeve without disconnecting the hose section from the body portion or without disconnecting the sleeve from the male member, the bearing balls 23 operating in the raceway to reduce friction and to secure the sleeve and body portion of the female member against accidental longitudinal separation. It will also be seen that the male member can be disconnected from the sleeve without separating the sleeve from said body portion and without disconnecting the hose section from the male member.

What is claimed is:—

1. A hose coupling comprising a male member, a female member composed of a body portion and a sleeve, said body portion having annular grooves and also an annular shoulder, said sleeve having an annular tongue in one end engaging in one of said annular grooves of the body portion and also having an annular groove coinciding with the other of said grooves of the body portion forming a raceway and also having an annular inwardly directed rib engaging the annular shoulder of the body portion, bearings balls in said raceway, the sleeve having an opening registering with the raceway, a removable closure for said opening, and a gasket overlying the joint between said shoulder and said rib and also lying against the inner end of the male member.

2. A hose coupling comprising a male member, a female member composed of a body portion and a sleeve, the body portion having a groove opening toward its inner end, the sleeve having a tongue fitting in said groove, the body portion and sleeve having coinciding grooves forming a raceway, and bearing balls removably disposed in the raceway, whereby the body portion may be separated from the sleeve without removing the hose from the body portion.

3. A hose coupling comprising a male member, a female member composed of a body portion and a sleeve, the body portion having a groove opening toward its rear end, the sleeve having a tongue fitting in said groove, means removably disposed between the body portion and the sleeve to prevent accidental longitudinal separation thereof and to permit disconnection of the body portion and sleeve without removing the hose from the body portion.

4. A hose coupling comprising a male member, a female member composed of a body portion and a sleeve, the body portion having a groove opening toward its rear end, the sleeve having a tongue fitted in said groove, means removably disposed between the body portion and the sleeve to prevent accidental longitudinal separation thereof and to permit disconnection of the body portion and sleeve independently of disconnection of the sleeve with the male member.

5. A hose coupling comprising a male member, a female member composed of a body portion and a sleeve, the sleeve embracing one end of the body portion, the body portion and sleeve having coinciding grooves forming a raceway, and the sleeve having a rib projecting inwardly beyond the inner circumference of said raceway and lying adjacent the inner end of said body portion, bearing balls removably disposed in the raceway whereby the body portion may be separated from the sleeve independently of disconnection of the sleeve with the male member.

6. A hose coupling comprising a male member, a female member composed of a body portion and a sleeve, said body portion having its inner end reduced forming a shoulder, said shoulder having a groove and the reduced portion having a groove, said reduced portion being further reduced forming a second shoulder, said sleeve having a tongue fitted in the first mentioned groove and also having a groove coinciding with the groove of the first mentioned reduced portion to provide a raceway, bearing balls in the raceway, the sleeve also having a rib projecting inwardly beyond the first mentioned reduced portion and engaging the second mentioned shoulder.

7. A hose coupling comprising a male member, a female member composed of a body portion and a sleeve, said body portion having its inner end reduced forming a shoulder, said shoulder having a groove and the reduced portion having a groove, said reduced portion being further reduced forming a second shoulder, said sleeve having a tongue fitted in the first mentioned groove and also having a groove coinciding with the groove of the first mentioned reduced portion to provide a raceway, bearing balls in the raceway, the sleeve also having a rib projecting inwardly beyond the first mentioned reduced portion and engaging the second mentioned shoulder, and a gasket overlying the joint between the second mentioned shoulder and said rib and also lying against the inner end of the male member.

8. A hose coupling comprising a male member, a female member composed of a body portion and a sleeve, said body portion having its inner end reduced forming a shoulder, said shoulder having a groove, said reduced portion being further reduced forming a second shoulder, said sleeve having a tongue fitted in the first mentioned groove, and means between the body portion and sleeve to prevent accidental longitudinal separation thereof, said sleeve also having a rib projecting inwardly beyond the first mentioned reduced portion and engaging the second mentioned shoulder.

9. A hose coupling comprising a male member, a female member composed of a body portion and a sleeve, said body portion having its inner end reduced forming a shoulder, said shoulder having a groove, said reduced portion being further reduced forming a second shoulder, said sleeve having a tongue fitted in the first mentioned groove, means between the body portion and sleeve to prevent accidental longitudinal separation thereof, said sleeve also having a rib projecting inwardly beyond the first mentioned reduced portion and engaging the second mentioned shoulder, and a gasket overlying the joint between the second mentioned shoulder and said rib and also lying against the inner end of the male member.

In testimony whereof I affix my signature, in presence of two witnesses.

JOHN H. STEPHENS.

Witnesses:
JOHN H. SIGGERS,
GEO. C. SHOEMAKER.